United States Patent
Bartley et al.

(10) Patent No.: US 6,482,377 B2
(45) Date of Patent: Nov. 19, 2002

(54) METHOD FOR BYPASSING SULFUR DIOXIDE AROUND AN AFTERTREATMENT DEVICE IN AN EXHAUST GAS AFTERTREATMENT SYSTEM

(75) Inventors: Gordon James J. Bartley, San Antonio, TX (US); Magdi K. Khair, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/037,407

(22) Filed: Jan. 4, 2002

(65) Prior Publication Data

US 2002/0058004 A1 May 16, 2002

Related U.S. Application Data

(62) Division of application No. 09/247,265, filed on Feb. 10, 1999, now Pat. No. 6,348,177.

(51) Int. Cl.⁷ .......................... B01D 53/50; B01D 53/92
(52) U.S. Cl. .................. 423/213.2; 423/213.5; 423/213.7; 423/239.1; 423/244.01; 423/244.02; 423/244.1; 423/230
(58) Field of Search .................. 423/213.2, 213.5, 423/213.7, 239.1, 244.01, 244.02, 244.06, 244.1, 230

(56) References Cited

U.S. PATENT DOCUMENTS

| | | | |
|---|---|---|---|
| 5,057,483 A | 10/1991 | Wan | 502/304 |
| 5,254,519 A | 10/1993 | Wan et al. | 502/252 |
| 5,472,673 A | 12/1995 | Goto et al. | 422/169 |
| 5,490,977 A | 2/1996 | Wan et al. | 423/210 |
| 5,727,385 A | 3/1998 | Hepburn | 60/279 |
| 5,753,192 A | 5/1998 | Dobson et al. | 42/177 |
| 5,758,489 A | 6/1998 | Hepburn et al. | 60/274 |
| 5,792,436 A * | 8/1998 | Feeley et al. | 423/210 |
| 5,837,212 A | 11/1998 | Hepburn et al. | 423/213.2 |
| 6,145,303 A * | 11/2000 | Strehlau et al. | 60/274 |
| 6,189,316 B1 * | 2/2001 | Surnilla et al. | 60/274 |
| 6,263,666 B1 * | 7/2001 | Kubo et al. | 60/277 |
| 6,318,073 B1 * | 11/2001 | Boegner et al. | 60/274 |
| 6,318,075 B1 * | 11/2001 | Günther et al. | 60/285 |
| 2001/0013223 A1 * | 8/2001 | Boegner et al. | 60/295 |

* cited by examiner

Primary Examiner—Wayne A. Langel
Assistant Examiner—Timothy C. Vanoy
(74) Attorney, Agent, or Firm—Baker Botts L.L.P.

(57) ABSTRACT

A method of treating exhaust from an internal combustion engine having an emission reduction device, such as a lean NOx trap. Exhaust from the engine is directed to a first sulfur trap, which treats the exhaust and discharges exhaust that is substantially free of sulfur. The exhaust from the first sulfur trap is normally directed to the emission reduction device, but is diverted to a second sulfur trap when the first sulfur trap is saturated. During this diversion, a reducing agent introduced upstream of the first sulfur trap aids in purging the first sulfur trap and in reducing metal sulfates and metal sulfites in the first sulfur trap to hydrogen sulfides, which are then treated by the second sulfur trap. When the first sulfur trap is thus purged, the exhaust gas is again directed to the emission reduction device.

8 Claims, 2 Drawing Sheets

METHOD FOR BYPASSING SULFUR DIOXIDE AROUND AN AFTERTREATMENT DEVICE IN AN EXHAUST GAS AFTERTREATMENT SYSTEM

CROSS-REFERENCING TO RELATED APPLICATION

This application is a divisional from U.S. patent application Ser. No. 09/247,265, filed on Feb. 10, 1999 by Gordon James Johnston Bartley, et al. and entitled "APPARATUS AND METHOD FOR BYPASSING SULFUR DIOXIDE AROUND AN AFTERTREATMENT DEVICE IN AN EXHAUST GAS AFTERTREATMENT SYSTEM" now U.S. Pat. No. 6,348,177.

TECHNICAL FIELD OF THE INVENTION

This invention relates generally to a system for trapping sulfur carried in exhaust gases from an internal combustion engine, and more particularly to such a system that prevents sulfur carried in the exhaust gases from passing through a sulfur-sensitive component of an exhaust gas aftertreatment system.

BACKGROUND OF THE INVENTION

Internal combustion engines generate oxides of nitrogen (NOx) emissions as the result of high temperature combustion. NOx emissions are known to be responsible for ground level ozone production through photocatalytic processes in the atmosphere. Regulations have been in place for over two decades to reduce NOx emissions from internal combustion engines. Hydrocarbons (HC) and carbon monoxide (CO) are also regulated as harmful emissions. Despite a large increase in the number of internal combustion engines in use, the atmospheric levels of HC and CO have been successfully reduced. However, NOx emissions have remained at approximately the same levels and have even increased in areas of high automobile usage, such as large metropolitan areas. As a result, proposed new regulations call for dramatic reductions in NOx emissions. A significant amount of research is currently being conducted into NOx catalysis and NOx traps in an attempt to find solutions that further reduce tailpipe NOx emissions. However, sulfur compounds (primarily in the form of $SO_2$ derived from naturally existing sulfur compounds in fuels which are oxidized to $SO_2$ through the combustion process) are recognized as primary inhibitors of NOx system efficiencies. Currently, some automotive catalytic systems require the use of low-sulfur gasoline fuel to prevent poisoning of the catalyst material used to reduce the NOx emissions. Oil companies are continually pressured to find sources of low-sulfur crude oil and significantly reduce the sulfur content of refined fuels, at increasing expense to the oil companies, costs that may ultimately be passed on to the end user.

Three-way conversion (TWC) catalysts are used in many vehicles to reduce emissions of NOx, CO, HC, and particulate matter. U.S. Pat. No. 5,057,483, issued Oct. 15, 1991 to Chung-Zong Wan for Catalyst Composition Containing Segregated Platinum and Rhodium Components, describes a catalyst having a bulk metal oxide, such as bulk nickel oxide, as one component of the catalytic system to suppress hydrogen sulfide ($H_2S$) emissions. Likewise, U.S. Pat. No. 5,490,977 issued Feb. 13, 1996 to Chung-Zong Wan for Removal of CO Hydrocarbons, and NOx with catalyst containing Platinum Rhodium, describes a three-way conversion (TWC) catalyst containing a metal oxide which is effective for the suppression of hydrogen sulfide. The metal oxide is preferably nickel oxide. Sulfur compounds, which result from the combustion of sulfur in commonly used fuels, are converted to hydrogen sulfide during transient fuel-rich operating conditions such as idling and acceleration. Hydrogen sulfide ($H_2S$) has a characteristic foul odor, often described as smelling like "rotten eggs". The metal oxide ($H_2S$) suppressor described in the referenced patent temporarily traps any hydrogen sulfide, thereby delaying the discharge of hydrogen sulfide from the catalyst until fuel-lean combustion operation is established whereupon an oxygen-rich environment is established in the exhaust gases and the hydrogen sulfide is oxidized to various sulfur compounds.

In both of the above-described TWC catalysts, hydrogen sulfide compounds are temporarily stored, but subsequently passed, in one form or another, through the $NO_x$ catalytic system. Therefore, over time, the active surfaces of the catalyst, designated for $NO_x$ reduction, become less effective due to the presence of sulfur compounds trapped on their surfaces.

The present invention is directed to overcoming the problems set forth above. It is desirable to have an exhaust gas aftertreatment system in which sulfur compounds are deleted from the exhaust gases passing through a sulfur-sensitive emission reduction device (SSERD) of the system. It is also desirable to have such a system in which sulfur compounds carried in the exhaust gas stream from the engine are initially trapped, stored, and then discharged from the trap by diverting the exhaust gas stream around the sulfur-sensitive emission reduction device (SSERD) during purging of the trap. It is also desirable to have such a system in which a lean sulfur trap is adapted to store sulfur compounds during lean fuel-air mixture combustion, and then when saturated, discharge the stored sulfur compounds to a rich fuel-air mixture sulfur trap by the injection of a reducing agent, such as a hydrocarbon fuel, upstream of the lean sulfur trap. It is also desirable to have such a system in which a first sulfur trap effectively carries out a reaction with sulfur compounds in an oxidizing atmosphere, and a second sulfur trap which effectively carries out the reaction of sulfur compounds in a reducing environment. The second sulfur trap is in selective fluid communication with the first sulfur trap. The second sulfur trap is adapted to receive exhaust gases containing hydrogen sulfide from the first sulfur trap. The hydrogen sulfide is reacted with a metal oxide in the second sulfur trap to form a metal sulfide and water, temporarily store the metal sulfide, and then oxidize the metal sulfide in the presence of exhaust gases that are substantially free of sulfur and have an excess of oxygen. Exhaust gases discharged from the second sulfur trap contain sulfur dioxide.

SUMMARY OF THE INVENTION

In accordance with one aspect of the present invention, a sulfur trap system for use in an exhaust gas aftertreatment system containing a sulfur-sensitive emission reduction device (SSERD) includes a first sulfur trap, a second sulfur trap, a means for selectively injecting a reducing agent into the exhaust gases prior to the exhaust gas being received by the first sulfur trap, and a means for selectively directing the exhaust gases discharged from the first sulfur trap to either the SSERD or the second sulfur trap. Sulfur dioxide is oxidized in the first sulfur trap, wherein sulfur is temporarily stored as sulfite and sulfate species. During normal operation, the exhaust gas discharged from the first sulfur trap is substantially free of sulfur, and the sulfur-free exhaust gases are accordingly directed through the SSERD of the aftertreatment system.

Other features of the sulfur trap system embodying the present invention include the first sulfur trap having a Group VIII metal catalyst such as platinum, palladium or rhodium. Other features include the second sulfur trap having a metal oxide, such as nickel oxide, germanium oxide, copper oxide, or manganese oxide. Still another feature includes the means for injecting a reducing agent into the exhaust gases being a fuel injector in fluid communication with a source of hydrocarbon fuel. Yet another feature includes the means for selectively directing exhaust gases discharged from the first sulfur trap to either the SSERD or the second sulfur trap being an exhaust gas flow diverter valve that is selectively moveable between a first position at which the exhaust gases are directed to the SSERD, and a second position at which the exhaust gases discharged from the first sulfur trap are directed to the second sulfur trap.

In another aspect of the present invention, a method for preventing sulfur dioxide from passing through a sulfur-sensitive emission reduction device (SSERD) in an exhaust gas aftertreatment system of an internal combustion engine that is adapted to generally operate in a lean fuel-air combustion mode (e.g. diesel or lean-burn gasoline), and discharge exhaust gases from the engine that contain excess oxygen remaining after combustion of the lean fuel-air mixture, include conducting the exhaust gases discharged from the internal combustion engine to a first sulfur trap disposed in direct fluid communication with an exhaust manifold of the engine. Sulfur dioxide carried in the exhaust gases discharged from the engine are oxidized in the first sulfur trap to form sulfur trioxide ($SO_3$), which is then converted to sulfite and sulfate species and temporarily stored in the first sulfur trap. The exhaust gases discharged from the first sulfur trap are thus substantially free of sulfur and are conducted to the SSERD. The point at which the first sulfur trap is substantially saturated with sulfite and "sulfate species is determined, and the flow of exhaust gas to the sulfur-sensitive emission reduction device (SSERD) is interrupted and directed to the second sulfur trap. A reducing agent is then injected into the exhaust gases prior to the exhaust gases being received by the first sulfur trap whereby the sulfite and sulfate species stored in the first sulfur trap are reduced to hydrogen sulfide and conducted to the second sulfur trap by the exhaust gases directed to the second sulfur trap. In the second sulfur trap, the hydrogen sulfide contained in the exhaust gases is reacted with a metal oxide to form a metal sulfide and water, the metal sulfide being temporarily stored in the second sulfur trap. The point at which the sulfite and sulfate species stored in the first sulfur trap are substantially completely reduced to hydrogen sulfide, is determined and the injection of the reducing agent into the exhaust gases is interrupted. The metal sulfide temporarily stored in the second sulfur trap is then oxidized, in the presence of the exhaust gases discharged from the first sulfur trap that are substantially free of sulfur and have an excess of oxygen carried therein, to form sulfur dioxide. Exhaust gases thus containing sulfur dioxide are discharged from the second sulfur trap. When the oxidation of metal sulfide in the second sulfur trap is substantially complete, the flow of exhaust gas to the second sulfur trap is interrupted, and redirected to the SSERD.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF THE INVENTION

Figure 1:
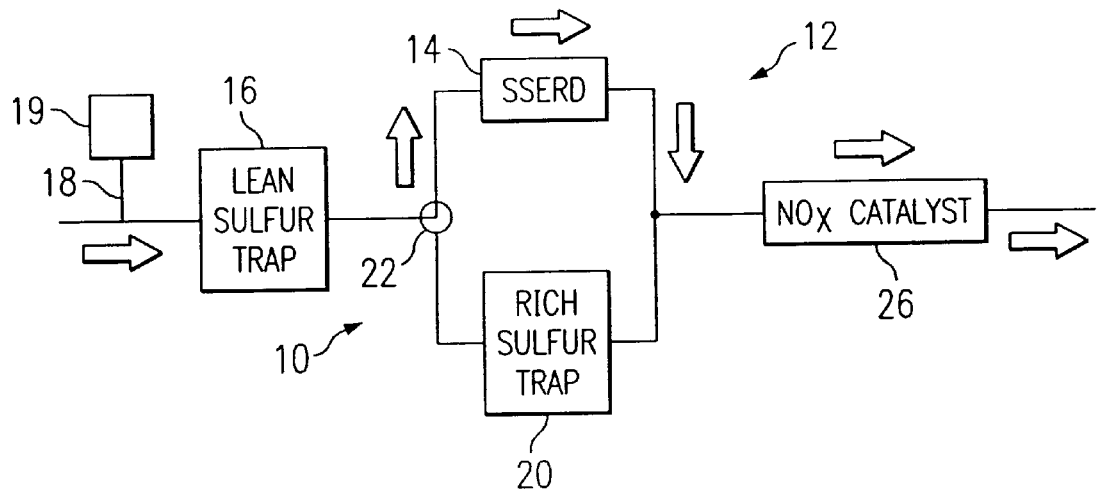
FIG. 1 is a schematic representation of the sulfur trap system embodying the present invention, showing the exhaust gases being directed through a sulfur-sensitive emission reduction device (SSERD) component of an aftertreatment system.
Figure 2:
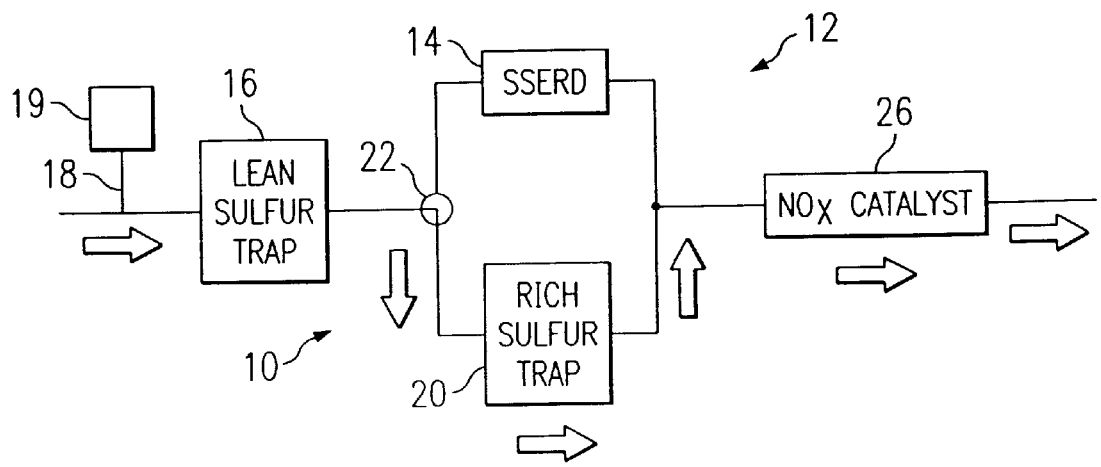
FIG. 2 is a schematic representation of the sulfur trap system embodying the present invention, showing the exhaust gases being directed through a second sulfur trap component of an aftertreatment system.

A preferred embodiment of a sulfur trap system, in accordance with the present invention, is generally indicated by the reference numeral 10 in FIGS. 1 and 2. The sulfur trap system 10 is particularly adapted for use in an exhaust gas aftertreatment system 12 containing a sulfur-sensitive emission reduction device (SSERD) 14, such as a lean $NO_x$ trap, lean $NO_x$ trap/catalyst, or lean $NO_x$ and/or particulate matter (PIVI) catalyst, specifically adapted for lean fuel-air internal combustion mode engine applications, such as lean burn gasoline engines and diesel engines. The sulfur trap system 10 embodying the present invention includes a first sulfur trap 16 disposed to receive exhaust gases discharged from an internal combustion engine (not shown), then discharge the exhaust gases to a bypass or diverter valve 22, preferably formed of a high-temperature, corrosion-resistant metal, for subsequent selective distribution to either the sulfur-sensitive emission reduction device (SSERD) 14 as illustrated in FIG. 1, or to a second sulfur trap 20 as shown in FIG. 2. The sulfur trap system 10 further includes a means 18, such as fuel injector, for injecting a reducing agent into the exhaust gases subsequent to the exhaust gases being discharged from the engine exhaust manifold and prior to being received by the first sulfur trap 16. The injection means is in fluid communication with a source of reducing agent 19, such as a hydrocarbon fuel. Desirably, the source 19 of hydrocarbon fuel may be associated with the engine fuel system. The aftertreatment system 12 may optionally include a $NO_x$ reduction catalyst 26 to convert residual unreacted $NO_x$ from the lean $NO_x$ trap/catalyst 14 under rich (oxygen lean) conditions, and to convert engine-out $NO_x$ during flow of exhaust gases during purge through the second sulfur trap 20, as described below in greater detail.

The operation of the sulfur trap system, will be first described as an overview of the entire aftertreatment system 12 operation, followed by more specific references to the construction and operation of the individual components of the sulfur trap system 10. The function of the sulfur trap system 10 embodying the present invention is to prevent sulfur compounds in the exhaust gases, primarily comprising sulfur dioxide ($SO_2$) from reaching the sulfur-sensitive emission reduction device (SSERD) 14, thereby optimizing the effectiveness of the SSERD by allowing the SSERD 14 to perform at its peak efficiency. Furthermore, the sulfur trap system 10 discharges sulfur from the system as $SO_2$, not as hydrogen sulfide ($H_2S$) which has an unpleasant odor, or as sulfuric acid ($H_2SO_4$)which contributes to particulate emissions.

With specific reference to FIGS. 1 and 2, $SO_2$ enters the lean sulfur trap 16 under normally lean exhaust conditions, i.e., normal combustion for lean burn (oxygen-rich) engines, and is converted to sulfur trioxide ($SO_3$) prior to storage in the lean sulfur trap 16 as sulfite and sulfate species. The exhaust gases discharged from the first, or lean, sulfur trap 16 are thus substantially free of sulfur, and are conducted by way of the diverter valve 22 to the SSERD 14 which is able to convert $NO_x$ and/or PM in the exhaust gases to nitrogen $N_2$, $H_2O$, and $CO_2$ under ideal conditions.

As the lean sulfur trap 16 begins to saturate, i.e., reach its maximum storage capacity, a reducing agent is injected into the engine-out exhaust gas stream, by way of the injection nozzle or fuel injection 18, just after, or simultaneously with, switching the flow diverter valve 22 to interrupt the flow of exhaust gas to the sulfur-sensitive emission reduction device (SSERD) 14 and direct the exhaust gas to the second, or rich, sulfur trap 20. Sulfur is rapidly released from the lean sulfur trap 16 in the form of hydrogen sulfide ($H_2S$). $H_2S$ reacts with a metal oxide in the rich sulfur trap 20, and the sulfur is stored as a metal sulfide. When the sulfur has been purged from the lean sulfur trap 16, and stored in the rich sulfur trap 20, the reducing agent injector 18 is switched off, whereupon the lean sulfur trap begins to store sulfur again, and the exhaust stream discharged from the lean sulfur trap is, accordingly, substantially free of sulfur and rich in oxygen. The exhaust gas continues to pass through the rich sulfur trap 20, and under lean combustion conditions, i.e., there is an excess of oxygen present in the exhaust gases, sulfur is purged from the rich sulfur trap 20 as $SO_2$ before exiting the aftertreatment system 12. When the sulfur has been purged from the rich sulfur trap 20, the diverter valve 22 is switched back so that the exhaust gases exiting the lean sulfur trap 16 are again directed to pass through the SSERD 14. The above cycle is repeated whenever the lean sulfur trap 16 begins to become saturated.

In the specific case of a $NO_x$ reduction component that operates by storing $NO_x$ under lean (oxygen-rich) exhaust conditions and then reducing the stored $NO_x$ to $N_2$ under richer conditions, the richer conditions may be advantageously induced by controllably injecting a reducing agent just upstream of the $NO_x$ reduction component 14 using the same strategy as that described above for the lean sulfur trap 14. If desired, the optional $NO_x$ reduction catalyst 26 may be used to convert residual unreacted $NO_x$ produced during fuel-rich engine operating conditions, such as rapid acceleration, and to convert engine-out $NO_x$ during operation of the rich sulfur trap 20.

The first, or lean, sulfur trap 16 preferably includes a Group VIII metal catalyst that is selected from the group consisting of platinum, palladium, or rhodium, and preferably platinum or mixtures of platinum and one or more other Group VIII metals, designated in the following discussion by the letter Q. The Group VIII metal Q is finely dispersed on a suitable support, such as high surface area alumina, ceria, or ceria/zirconia solid solutions or mixtures thereof, whereby $SO_2$ in the exhaust gases is first oxidized to $SO_3$ by the Group VIII metal Q and then reacted with the support M to form sulfate ($MSO_4$) and sulfite ($MSO_3$) species which are temporarily stored in the first sulfur trap 16.

The second, or rich, sulfur trap 20 desirably includes a suitable metal oxide, such as nickel oxide, germanium oxide, copper oxide or manganese oxide, and preferably nickel oxide, and will be referred to hereinafter by the generic representation "MO." The metal oxide (MO), upon reaction with $H_2S$ forms a metal sulfide (MS) plus water ($H_2O$). The metal sulfide is stored in the second sulfur trap until all of the sulfur from the lean sulfur trap 16 has been reduced and discharged, the addition of the reducing agent terminated, and a lean (oxygen rich) sulfur-free exhaust gas stream is discharged from the lean sulfur trap 16, whereupon the metal sulfide (MS) is oxidized by passage of the oxygen rich exhaust gases through the rich sulfur trap 20, and sulfur dioxide ($SO_2$) is discharged.

A method for diverting sulfur dioxide around a sulfur-sensitive emission reduction device (SSERD) in an exhaust gas aftertreatment system of an internal combustion engine adapted to operate in a lean fuel-air mixture combustion cycle and discharge exhaust gases from the engine that contain excess oxygen remaining after combustion of the lean fuel-air mixture, is described as follows with specific reference to FIG. 3. As represented at block 30, exhaust gases, containing excess oxygen, and sulfur as $SO_2$, among other compounds, is discharged from an engine and conducted to the lean sulfur trap 16. In the lean sulfur trap 16, the $SO_2$ is oxidized to form $SO_3$, as indicated at block 32 and the $SO_3$ reacted with an oxide MO to form sulfate and sulfite species, as indicated at block 34, which are stored in the lean sulfur trap 16, as indicated at block 36. The exhaust gases, thus stripped of sulfur, are directed to the SSERD 14, by way of the diverter valve 22, as illustrated in FIG. 1 and represented by block 38. When the sulfate/sulfite ($MSO_4/MSO_3$) species begin to saturate, i.e., approach 100% of the storage capacity of the lean sulfur trap 16, that condition is determined, as represented by block 40. Determination of this condition may be either by appropriate sensors, such as the lean $SO_2$ sensor described in U.S. Pat. No. 5,338,515 issued Aug. 15, 1994 to Dalla Betta, et al, positioned immediately downstream of the lean sulfur trap 16, or by empirical or historical data, whereby it is known that under certain engine operating conditions, the storage capacity of the lean sulfur trap 16 is reached after a given period of operation, for example, thirty minutes.

Figure 3:
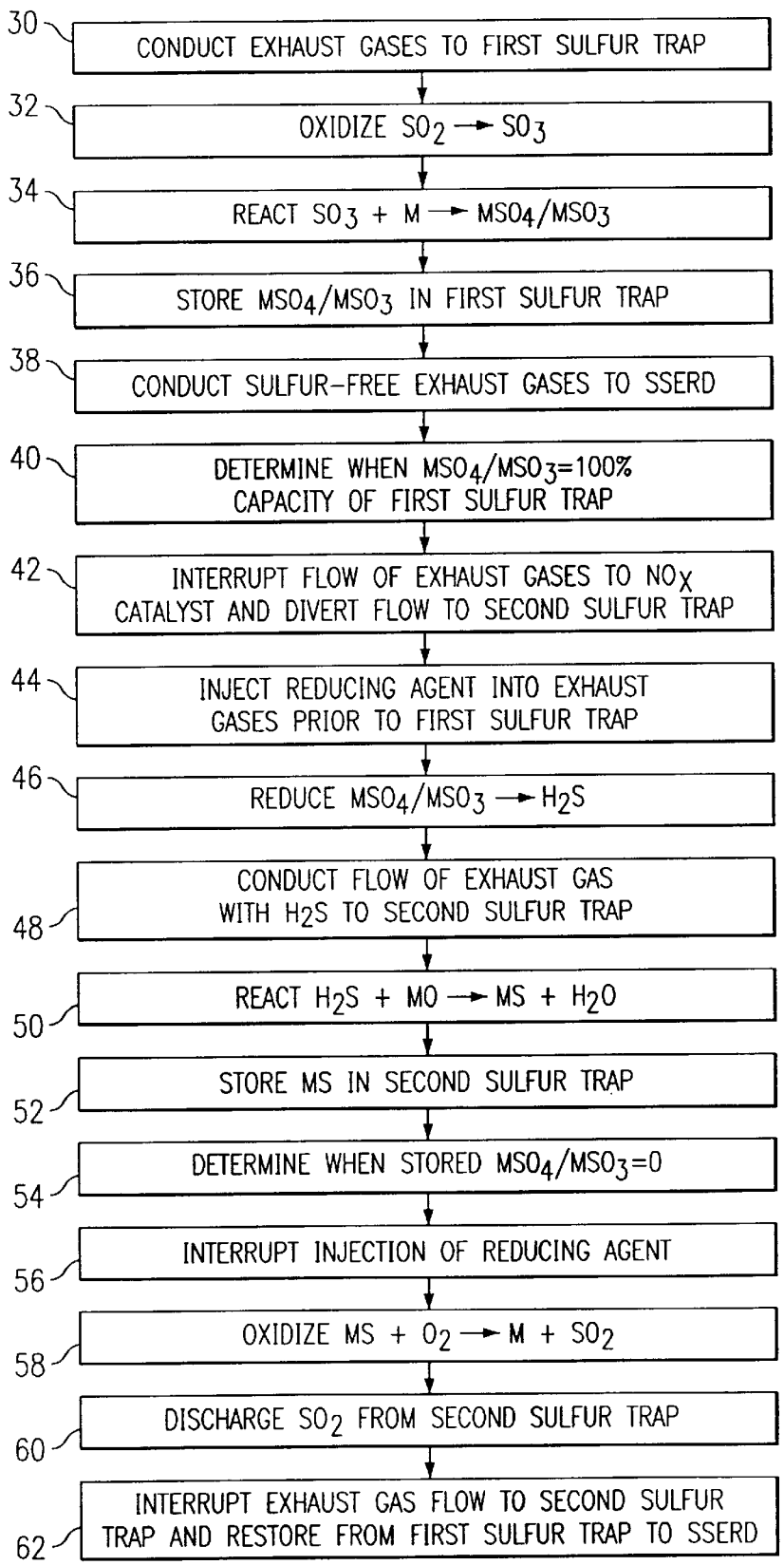
FIG. 3 is a flow chart illustrating the steps carried out in a method for preventing sulfur dioxide from passing through a SSERD of an aftertreatment system, in accordance with the present invention.

When it is so determined that the storage capacity of the lean sulfur trap is approaching saturation, the flow of exhaust gases to the lean sulfur-sensitive emission reduction device (SSERD) 14, as represented by the directional flow arrows in FIG. 1, is interrupted, by switching the flow diverter valve 22, to direct the flow of exhaust gases exiting the lean sulfur trap 16 to the rich sulfur trap 20, as represented in FIG. 2, and at block 42 in FIG. 3. A reducing agent, for example, a hydrocarbon fuel, is then injected into the exhaust gases prior to the lean sulfur trap 16, as represented at block 44, whereupon the stored sulfate/sulfite species are reduced to hydrogen sulfide, as indicated at block 46. The exhaust gas containing hydrogen sulfide is thus conducted to the rich sulfur trap 20, as indicated at block 48, whereupon the hydrogen sulfide is reacted with the metal oxide in the rich sulfur trap 20, to form a metal sulfide and water, as represented at block 50 of FIG. 3. The metal sulfide is then temporarily stored in the second sulfur trap 20, as represented at block 52 until it is determined that the sulfate/sulfite species stored in the lean sulfur trap 16 have been substantially completely reduced to hydrogen sulfide, as represented at block 54. Whereupon the injection of the reducing agent into the exhaust gas stream is interrupted, as indicated at block 56.

The exhaust gas stream discharged from the lean sulfur trap 16 to the rich sulfur trap 20 thus returns to its initial oxygen-rich condition, and furthermore is substantially free of sulfur due to the lean sulfur trap 16 again becoming operable to react and store sulfur dioxide. Due to the passage of the oxygen-rich exhaust gases through the rich sulfur trap 20, the metal sulfide is oxidized, as represented at block 58, to form sulfur dioxide which is discharged from the second sulfur trap 20 as represented at block 60. The purging of the lean sulfur trap 16, as the result of injecting the reducing agent, should require only a relatively short period of time, for example, on the order of thirty seconds. Likewise, once the purging of the lean sulfur trap 16 has been completed, and the oxygen-rich exhaust gases pass through the rich sulfur trap 20, the oxidation of metal sulfide in the rich sulfur trap should likewise require only a relatively short period of time, for example on the order of ten seconds. Thus, it can be seen that the sulfur trap system 10 purge, including reducing stored sulfites and sulfates in the lean sulfur trap and oxidizing metal sulfides in the rich sulfur trap, requires only a short period of time during which the exhaust gases are not being passed through the SSERD 14. However, if so desired, a supplemental $NO_x$ catalyst 26, positioned downstream of both the SSERD 14 and the rich sulfur trap 20, may be advantageously used to convert $NO_x$ carried in the exhaust gases during recycling of the sulfur trap system 10. If desired, $SO_2$ sensors, as referenced above, may be used to determine the appropriate start and duration period of each of the purge cycles. In addition, the supplemental $NO_x$ catalyst 26 is useful in converting residual unreacted $NO_x$ discharged from the sulfur-sensitive emission reduction device (SSERD) 14 during transient rich fuel operation.

After purging of the lean sulfur trap 16 and the rich sulfur trap 20 are complete, the exhaust gas flow through the rich sulfur trap 20 is interrupted, by again switching the diverter valve 22, whereupon flow from the lean sulfur trap 16 is again restored to the SSERD 14 as indicated at block 62 in FIG. 3.

Although the present invention is described in terms of a preferred exemplary embodiment, with specific illustrative method steps and system arrangements, those skilled in the art will recognize that changes in those illustrated method steps and system arrangements which do not affect the bypassing of sulfur around a sulfur-sensitive emission reduction device (SSERD) component of an aftertreatment system, may be made without departing from the spirit of the invention. Such changes are intended to fall within the scope of the following claims. Other aspects, features and advantages of the present invention may be obtained from a study of this disclosure and the drawings, along with the appended claims.

What is claimed is:

1. A method for reducing the sulfur dioxide passing through a sulfur-sensitive emission reduction device in an exhaust gas aftertreatment system of an internal combustion engine, said method comprising:

conducting exhaust gases discharged from said internal combustion engine to a first sulfur trap;

converting sulfur dioxide carried in said exhaust gases discharged from said engine to sulfite and sulfate species in said first sulfur trap;

storing said sulfite and sulfate species in said first sulfur trap;

conducting a flow of exhaust gas that is substantially free of sulfur dioxide from said first sulfur trap to said sulfur-sensitive emission reduction device;

determining a point at which said first sulfur trap is substantially saturated with said sulfite and sulfate species;

interrupting the flow of exhaust gas to said sulfur-sensitive emission reduction device and conducting a flow of exhaust gas from said first sulfur trap to a second sulfur trap; and treating the exhaust gas with the second sulfur trap.

2. The method for diverting sulfur dioxide around a sulfur-sensitive emission reduction device, as set forth in claim 1, wherein the first sulfur trap oxidizes sulfur dioxide to sulfur trioxide, converts said sulfur trioxide to sulfite and sulfate species, and stores said sulfite and sulfate species.

3. The method for diverting sulfur dioxide around a sulfur-sensitive emission reduction device, as set forth in claim 1 wherein the first sulfur trap is a metal catalyst.

4. The method for diverting sulfur dioxide around a sulfur-sensitive emission reduction device, as set forth in claim 1, wherein the second sulfur trap reacts with hydrogen sulfide contained in the exhaust gases.

5. The method of claim 1, wherein the second sulfur trap includes a metal oxide.

6. The method of claim 1, further comprising the step of injecting a reducing agent into said exhaust gases upstream of the first sulfur trap.

7. The method of claim 6 wherein the injecting step occurs in response to the determining step.

8. The method of claim 6, further comprising the steps of ending the injecting step such that the exhaust into the second sulfur trap is oxygen rich and sulfur poor and purges the second sulfur trap.

* * * * *